(12) United States Patent
Migliori et al.

(10) Patent No.: US 10,291,268 B1
(45) Date of Patent: May 14, 2019

(54) METHODS AND SYSTEMS FOR PERFORMING RADIO-FREQUENCY SIGNAL NOISE REDUCTION IN THE ABSENCE OF NOISE MODELS

(71) Applicant: The United States of America as represented by the Secretary of the Navy, Washington, DC (US)

(72) Inventors: Benjamin J. Migliori, San Diego, CA (US); Daniel J. Gebhardt, San Diego, CA (US); Michael W. Walton, San Diego, CA (US); Logan M. Straatemeier, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 15/659,298

(22) Filed: Jul. 25, 2017

(51) Int. Cl.
*H04B 17/00* (2015.01)
*H04B 1/04* (2006.01)
*G06N 3/02* (2006.01)
*H04B 1/7105* (2011.01)
*H04B 1/707* (2011.01)
*H04B 1/7176* (2011.01)

(52) U.S. Cl.
CPC ............ *H04B 1/0475* (2013.01); *G06N 3/02* (2013.01); *H04B 1/70712* (2013.01); *H04B 1/71055* (2013.01); *H04B 1/7176* (2013.01)

(58) Field of Classification Search
CPC ................ H04B 1/0475; H04B 1/0712; H04B 1/71055; G06N 3/02; G06N 99/05; G06N 7/046

USPC .......... 455/63.1, 67.13, 114.2, 277.2, 277.8; 706/21, 15, 31, 32
See application file for complete search history.

(56) References Cited

U.S. PATENT DOCUMENTS

| 4,912,651 A | * | 3/1990 | Wood | G06N 3/084 706/25 |
| 5,140,530 A | * | 8/1992 | Guha | G06N 3/086 706/13 |
| 6,449,603 B1 | * | 9/2002 | Hunter | G06K 9/6229 706/15 |
| 6,898,582 B2 | * | 5/2005 | Lange | G06K 9/0051 706/14 |
| 7,313,550 B2 | * | 12/2007 | Kulkarni | G06N 3/086 706/13 |
| 2007/0022068 A1 | * | 1/2007 | Linsker | G05B 13/026 706/23 |
| 2016/0140956 A1 | * | 5/2016 | Yu | G10L 15/08 704/240 |

* cited by examiner

*Primary Examiner* — Sonny Trinh
(74) *Attorney, Agent, or Firm* — SPAWAR Systems Center Pacific; Kyle Eppele (57) ABSTRACT

Time-varying input signals are denoised by a neural network. The neural network learns features associated with noise added to reference signals. The neural network recognizes features of noisy time-varying input signals mixed with the noise that at least partially match at least some of the features associated with the noise. The neural network predicts denoised time-varying output signals that correspond to the time-varying input signals based on the recognized features of the noisy time-varying input signals that at least partially match at least some of the features associated with the noise.

20 Claims, 7 Drawing Sheets

$$W = \begin{bmatrix} w_{00} & w_{01} & 0 & w_{10} & w_{11} & 0 & 0 & 0 & 0 \\ 0 & w_{00} & w_{01} & 0 & w_{10} & w_{11} & 0 & 0 & 0 \\ 0 & 0 & 0 & w_{00} & w_{01} & 0 & w_{10} & w_{11} & 0 \\ 0 & 0 & 0 & 0 & w_{00} & w_{01} & 0 & w_{10} & w_{11} \end{bmatrix}$$

FIG. 4

Convolution          Deconvolution

METHODS AND SYSTEMS FOR PERFORMING RADIO-FREQUENCY SIGNAL NOISE REDUCTION IN THE ABSENCE OF NOISE MODELS

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 104605.

FIELD OF THE INVENTION

The present invention pertains generally to noise reduction. More particularly, the present invention pertains to reducing noise in a radio frequency signal in the absence of a noise reduction model.

BACKGROUND OF THE INVENTION

Much of the effort in improving the signal-to-noise ratio (SNR) of radio-frequency (RF) transmissions resides in the physical layer, i.e. antennas, cabling, and filters.

Digital signal processing methods (DSP) have also been used to boost SNR. Such DSP methods have included simple matched filtering, in which a time-reversed template signal is convolved with an unknown signal to locate the maximum correlation, or Fourier based filtering, in which certain spectral bands are suppressed to excise the signal. More complex methods can also be used, such as Bayesian decision rules to decide if a signal is present or not present (optimal detection theory). Sometimes, representing the signal in a different way, such as by projecting into a new space in which the signal and noise no longer overlap (via wavelet or other decompositions) can allow an improvement in SNR.

A crucial weakness of the standard methods of improving SNR is the reliance upon prior information in regard to the signal being denoised. Blind SNR improvement is much more challenging. Many signals have both high and low frequency components, and they are often mixed in complex ways. The same can be said of the environmental noise. Without a clear knowledge of the specific features of the signal and the noise, blind methods are very likely to filter out important features of the signal. Similarly, it is insufficient to have a known signal and unknown noise, or vice versa, as blind filtering is likely to have detrimental effects on the signal.

In view of the above, it would be desirable to be able to denoise signals in order to improve SNR, without relying upon prior information regarding the signals being denoised or the noise to which the signals are subjected.

SUMMARY OF THE INVENTION

According to an illustrative embodiment, time-varying input signals are denoised by a neural network. The neural network learns features associated with noise added to reference signals. The neural network recognizes features of noisy time-varying input signals mixed with the noise that at least partially match at least some of the features associated with the noise. The neural network predicts denoised time-varying output signals that correspond to the time-varying input signals based on the recognized features of the noisy time-varying input signals that at least partially match at least some of the features associated with the noise.

These, as well as other objects, features and benefits will now become clear from a review of the following detailed description, the illustrative embodiments, and the accompanying drawings.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

According to illustrative embodiments, neural networks can be trained to improve signal-to-noise ratio (SNR) in a model-free way. The terminology "model-free" specifically implies that the neural network operates without an expert model of either the signal or the noise, and instead utilizes signal examples. Thus, the present invention allows for a reduction in environmental noise contamination of radio-frequency transmissions without the use of prior noise models or prior signal models. This is accomplished by using convolutional autoencoder networks designed to enable end-to-end reconstruction of input signals. Instead of relying on signal or noise models, the systems and methods described herein are fully adaptable and learn to counteract noise during a training phase. Consequently, the system and methods described herein may be widely applicable in complex electromagnetic environments. The invention allows improvement in SNR of signals transmitted within environments containing uncharacterized noise sources.

This may allow for better, more reliable transmission within a wide array of potential environments.

Figure 1:
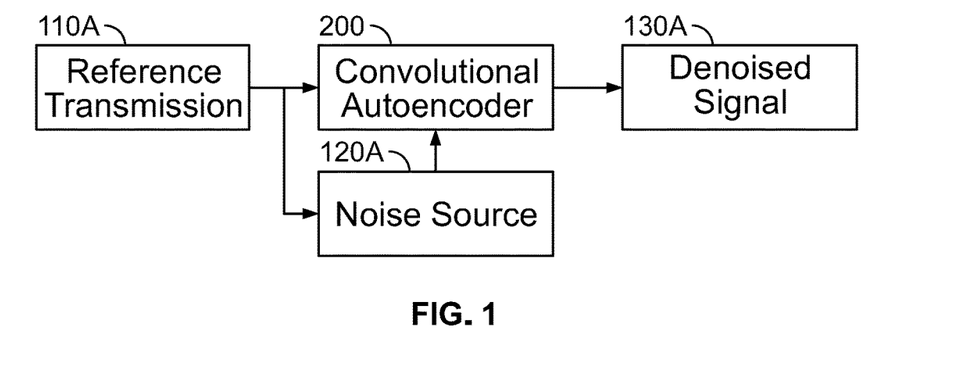
FIG. 1 illustrates an example configuration for training a convolutional autoencoder for performing denoising according to illustrative embodiments.

FIG. 1 illustrates an example configuration for training a convolutional autoencoder for performing denoising according to illustrative embodiments. As shown in FIG. 1, reference transmission signals 110A exposed to a noise source 120A representing a transmission environment having unknown noise are used to train a convolutional autoencoder 200. The reference transmission signals 110A are received by the convolutional autoencoder 200, along with noisy input signals including the reference signals 110A mixed with the noise from a noise source 120A.

The convolutional autoencoder 200 is configured to ingest in-phase/quadrature (I/Q) radio signals of various modulation schemes. For training, random bit strings may be encoded according to these modulations to create a training set consisting of many signals, denoted as s. This set may also be referred to as a probe set. This probe set is input as the reference signal 110A. For a given input s, stochastic (random) noise representing a transmission environment is added by the noise source 120A, such that the input signal for unsupervised training is s+n. An example of random noise is additive white Gaussian noise (AWGN). The convolutional autoencoder 200 is then trained to reconstruct the reference input s as the denoised signal 130A. According to an example embodiment, the mean squared error (MSE) between the original signal s and the reconstruction M(s+n) is used as the loss function (also referred to as the cost function). The convolutional autoencoder 200 is trained by assigning weights of filters of the convolutional autoencoder 200 based on features associated with the noise n added to the reference signals s, predicting denoised output reference signals that correspond to the reference signals s without noise, calculating the loss function corresponding to an error between the reference signals s and the predicted denoised output reference signals, and repeatedly adjusting the weights of the filters such that the loss function is minimized.

In the configuration shown in FIG. 1, the reference signals 110A may be random probing signals obtained by probing a transmission environment. To characterize an environment in an autonomous fashion, the convolutional encoder 200 may transmit and receive random bit strings through an existing propagation channel (transmission environment) to generate a reference signal dataset as needed. This reference signal dataset could be used to train the convolutional encoder 200, allowing new, non-random transmissions to have their SNR boosted in a model-free way. This opens up new opportunities for efficient use of an increasingly complex electromagnetic signaling environment.

Figure 2:
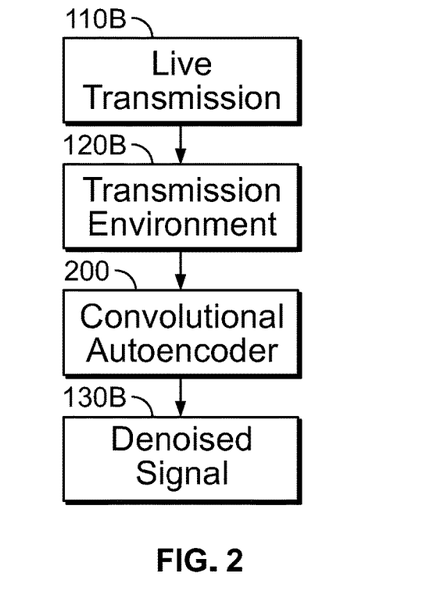
FIG. 2 illustrates an example configuration of a trained convolutional autoencoder for performing denoising according to illustrative embodiments.

FIG. 2 illustrates an example configuration of a trained convolutional autoencoder for performing denoising according to illustrative embodiments. After the convolutional autoencoder 200 is trained, new signals, $s_u$+n, including uncontaminated transmission signals 110B and noise due to a transmission environment 120B, are then ingested as signals 110B. Importantly, the noise introduced by the transmission environment 120B is the same as the noise added by the noise source 120A (FIG. 1). Using the trained weights and convolutional filters learned from the unsupervised pre-training, the convolutional autoencoder 200 recognizes features of the noisy input signal 110B that at least partially match features that were learned to be associated with the noise and then emits a predicted denoised output signal $s_p$ which is the best estimate of the noisy input signal with the noise removed, expressed as $s_u$−n. Thus, the convolutional autoencoder 200, trained as described above with reference to FIG. 1, produces a prediction of the denoised signal 130B. The denoised signal may then be processed by downstream signal processing components as appropriate.

Figure 3:
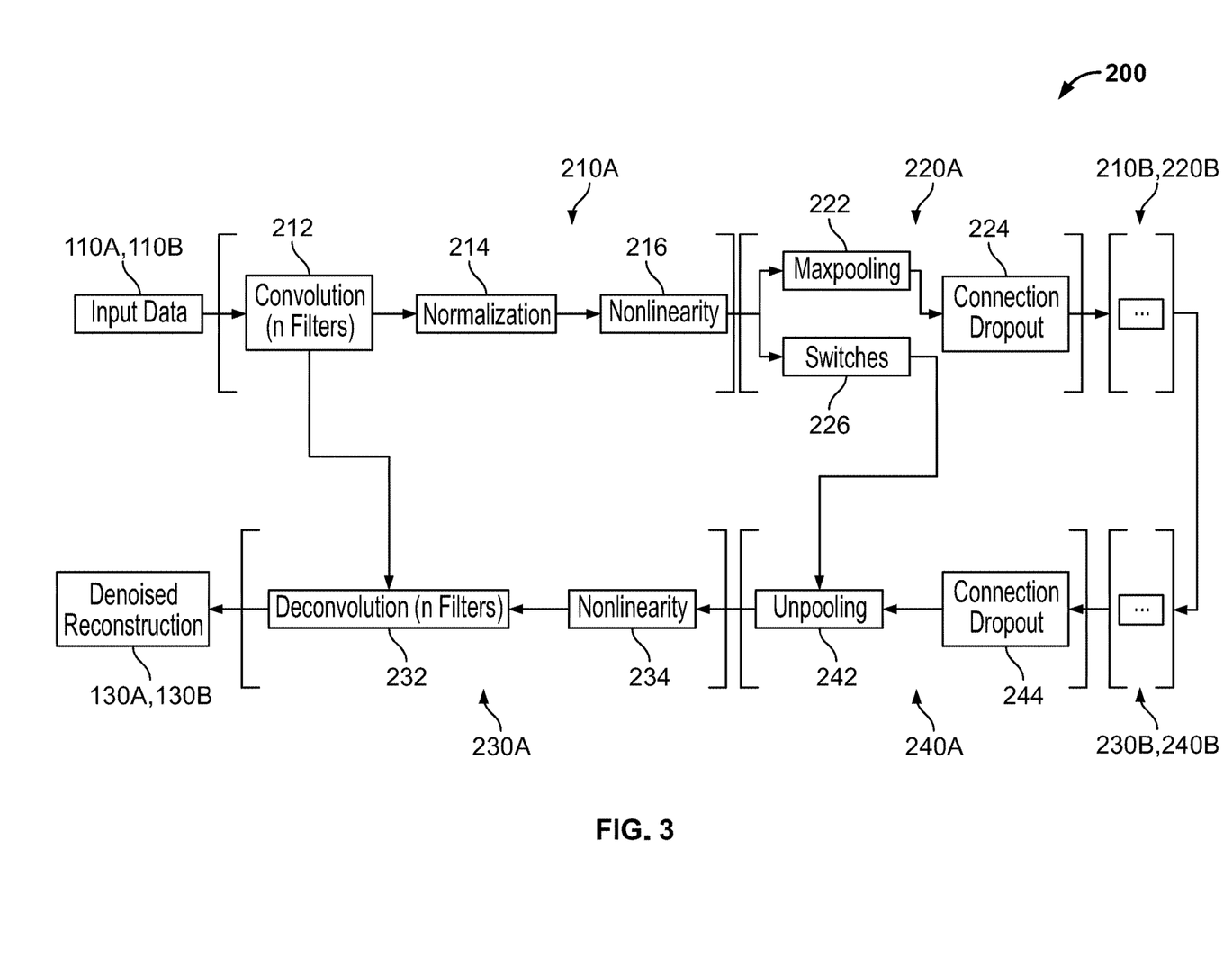
FIG. 3 illustrates in detail an example configuration for performing denoising using a convolutional autoencoder according to illustrative embodiments.

FIG. 3 illustrates in detail an example configuration for performing denoising using a convolutional autoencoder according to illustrative embodiments. Referring to FIG. 3, the convolutional autoencoder 200 includes at least one layer including convolutional elements 210A and pooling elements 220A. Once a stack of these elements has been built, a corresponding layer of a deconvolutional elements 230A and unpooling elements 240A is constructed to mirror the convolutional stack.

The convolutional elements 210A include a convolving encoder 212 having a bank of n filters, the filters also referred to as a "kernel". The input data 110A (for the training phase) or 110B (for the post-training phase) is converted to a vector form, and the convolving encoder 212 convolves the input vector v with the kernel. It should be appreciated by those skilled in the art that conversion of the input data to a vector form may be achieved via any suitable device, the details of which are not described herein in the interest of brevity. The convolving encoder 212 performs convolution with a filter bank of n filters, each including various weights, to produce a set of feature maps. The weights are assigned and adjusted during the training phase as described above based on the input data 110A. After training, the feature maps represent recognized features of the noisy time-varying input signals 110B that at least partially match at least some of the features associated with the noise. Convolution is described in more detail below with reference to FIG. 4.

The feature maps are then batch normalized by a normalization unit 214 to account for covariate shifts. Then, an element-wise rectified nonlinearity is applied by a nonlinearity unit 216. This results in normalized, non-linear feature maps.

The pooling elements 220A include a maxpooling element 222 which selects the maximum value of each of the pooling regions of each feature map, as described below with reference to FIG. 5B. In order to facilitate semi-lossless unpooling operations, switches 226 are used to encode the location of the maximum features in the pooling regions at each pooling operation. This allows the pooling operation to be reversed, as described below with reference to FIG. 5C. A connection dropout element 224 randomly drops values from the pooling regions, such that the max pooling becomes random. This is described in more detail below with reference to FIG. 5E.

The depooling elements 240A include a connection drop element 244, which restores the values that were dropped from the pooling regions. The depooling elements 240A also include an unpooling element 242 which reverses the pooling operation using the switches 226, as described in more detail below with reference to FIG. 5C. The depooling elements 240A produce dense feature maps corresponding to the feature maps output by the convolving elements 210A, with some loss due to the pooling/depooling.

Deconvolution elements 230A include a nonlinearity element 234 which linearizes the nonlinear feature maps. The linear feature maps are then deconvolved by a deconvolving decoder 232 using the transposed filter bank or kernel of the convolving encoder 212 to extract the features of the noisy input signal 110B that are recognized as at least partially matching at least some of the features associated with the noise. Deconvolution is described in further detail below with reference to FIG. 4.

The output of the deconvolving decoder 232 is a vector that is then converted into a predicted noiseless output 130A (during the training phase) or 130B (during the post-training phase). It should be appreciated by those skilled in the art that the vector may be converted into the predicted output via any suitable device, the details of which are omitted here in the interest of brevity.

The convolutional autoencoder 200 shown in FIG. 3 is used during a training phase and in a post-training phase. Functionally, the convolutional autoencoder 200 will learn a feature space into which an arbitrary input (such as RF signals) is projected into. Once projected into this lower-dimensional space, the deconvolutional path attempts to reconstruct the input. The unpooling assists with the denoising, as only the maximum feature location is recorded. As a result, lower confidence features are not represented in the final output.

It should be noted that there is no learning involved in the maxpooling/unpooling stages during the training phase. However, the upsampled maps are convolved with trainable encoder filters to densify the sparse inputs. So there is a tie between the maxpooling/unpooling stages and learning.

Although a convolutional autoencoder including only one of each of the elements 210A, 220A, 230A, and 240A is shown in FIG. 3, it should be appreciated that the neural network configuration may include a series of pre-trained convolutional/deconvolutional layers and maxpooling/connection drop out layers, as represented by the blocks 210A, 220B, 230B, and 240B.

It should be appreciated that the size and number of layers in the denoising convolutional autoencoder configuration described herein may be altered, e.g., to allow for a longer time series of I/Q samples to be processed.

Now the that the convolution autoencoder has been described at a high level, details of the convolution, deconvolution, maxpooling, unpooling, and connection dropout elements will be given to aid in understanding of the invention.

A convolutional autoencoder (CAE) is simply an autoencoder that incorporates model design principals from convolutional neural networks (CNN). The encoder path of a CAE is a standard CNN. The structure of the decoder path of a CAE, however, is non-trivial. In classical autoencoders, an appropriate definition for the decoder path follows naturally by inverting the matrix multiplication operations at each layer in a "mirrored" layer-wise fashion. This is not possible for traditional CNNs, as some operations, such as max pooling, are lossy and non-invertible. In the following, techniques are described that enable convolutional autoencoders to encode information end-to-end, rather than in a layer-wise fashion.

The mechanism for properly inverting the convolution operation of a CNN may be understood using a matrix representation. In the simple case of a square input, the input is flattened into a vector v. The convolution kernel or filter may be represented as a matrix with non-zero elements corresponding to the $w_{ij}$ components of the convolution filter as the matrix W shown in FIG. 4.

Figure 4:
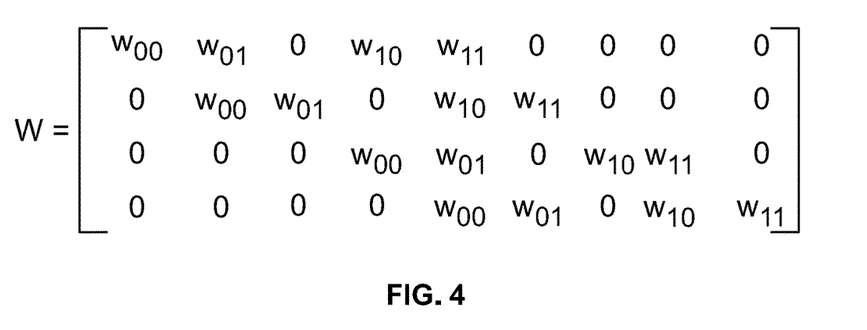
FIG. 4 illustrates an example of a matrix including weights in a kernel of a layer of a convolutional autoencoder.

Convolution of the vector v with the convolutional kernel involves a simple matrix multiplication v·W which produces a vector v' Reshaping v' into the desired shape (in a manner which would be evident to one skilled in the art) yields the convolved output. Thus, the corresponding deconvolution kernel or filter becomes the transposed kernel, which may be represented as the transposed matrix $W^T$. Further, the transposed convolution is the gradient of the corresponding convolution with respect to its input. Thus, the "forward pass" of the convolutional element is computed using W and the "backward pass" (used for back-propagation) of the deconvolutional element is computed using $W^T$.

Figure 5A:
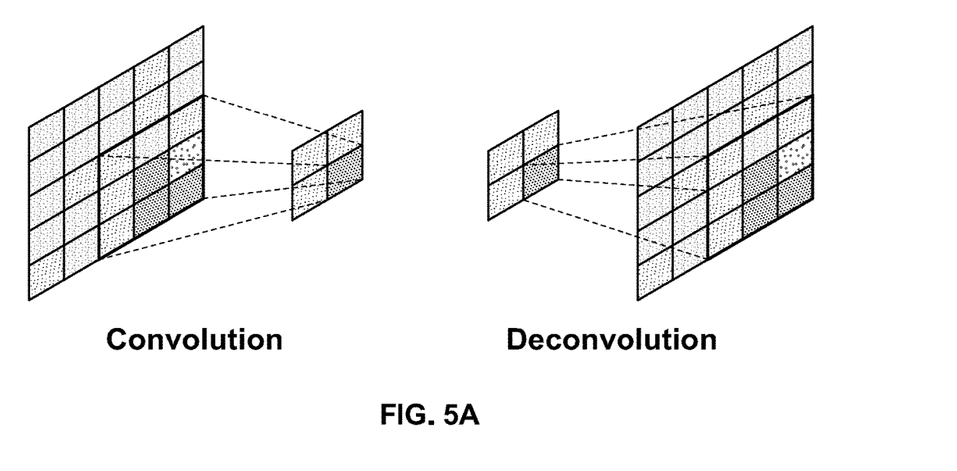
FIG. 5A is a conceptual depiction of convolutional encoding.

In practice, the transpose convolution may be implemented by simply swapping the forward and backward pass. This process is shown in the FIG. 5A which conceptually depicts features of convolutional autoencoders. As shown on the left portion of FIG. 5A, convolution condenses information on the forward pass of the autoencoder. On the backward pass, deconvolution allows reconstruction of the input signal based on the condensed information using the transposed convolutional kernel.

Turning now to the details of maxpooling, as noted above, maxpooling is also used to condense the information on the forward pass of the autoencoder. Max-pooling reduces the amount of information that needs to be stored and analyzed, improving processing time. Rather than storing all the values in the feature maps, only the max-pooling indices of various pooling regions of the feature maps are stored. That is, the location of the maximum feature value of each of the pooling regions is memorized for each encoder feature map. This may be understood with reference to FIG. 5B which illustrates an example of pooling data in a pooling region.

Figure 5B:
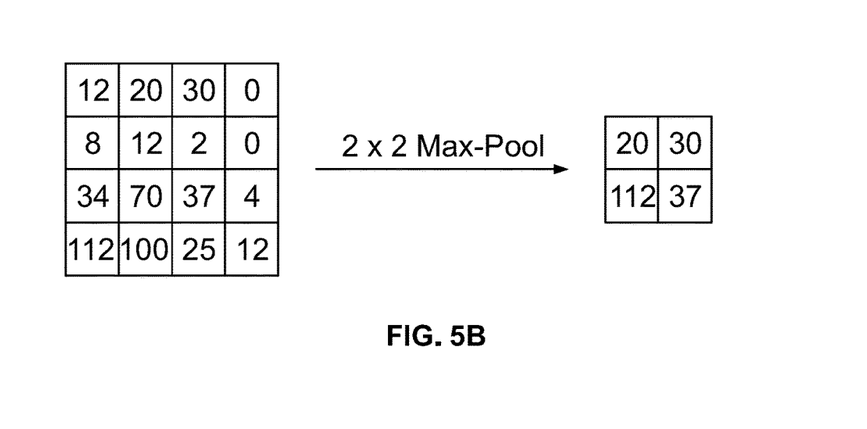
FIG. 5B illustrates an example of pooling data in a pooling region.

Referring to FIG. 5B, a 4×4 array, which represents a feature map output by the convolving elements, may be divided into four 2×2 pooling regions. The pooling operation selects the maximum value in each pooling region and stores it a location of 2×2 array. As shown in FIG. 5B, the maximum value "20" of the upper left pooling region of the 4×4 array is stored in the upper left corner of the 2×2 array, the maximum value "30" of the upper right pooling region of the 4×4 array is stored in the upper right corner of the 2×2 array, and so on.

Pooling operations subsample the feature map to produce a pooled feature map. Naïve upsampling approaches have used interpolation to reverse the pooling operation. Such approaches have yielded results which are less than optimal, as demonstrated below with reference to FIG. 5D.

According to an illustrative embodiment, instead of naïve upsampling, unpooling uses switch variables to recreate an unpooled feature map. Importantly, the unpooling stage is not lossless, and only retains information corresponding to the maximum feature present. A natural extension to max-pooling is to define an operation which returns the locations of the maximum values in the pooled feature maps. The locations, which are also referred to herein as switches include the i, j coordinates of each maximum value of a pooling region in a feature map. To invert the max pooled feature map, it is then straightforward to construct an unpooled feature map of the same dimension as the input feature map with the maximum values inserted at coordinates i, j and zeros inserted elsewhere. This approximate inverse of the pooling operation, referred to as unpooling, produces a sparse upsampling without discarding structural information by arbitrarily inserting the maximum values.

Figure 5C:
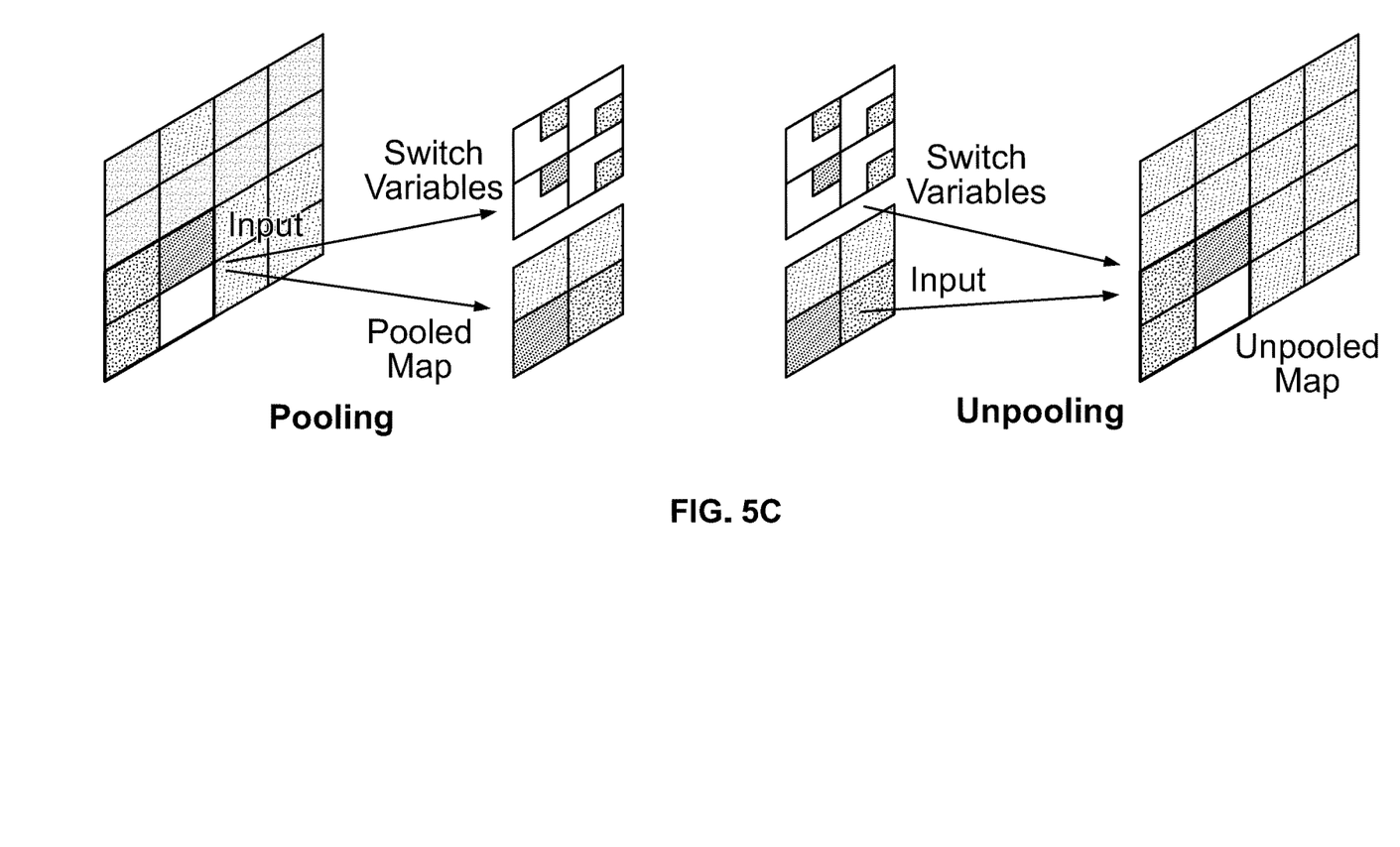
FIG. 5C is a conceptual illustration of pooling and unpooling.

FIG. 5C is a conceptual illustration of pooling and unpooling. As can be seen from FIG. 5C, the pooling operation creates a pooled map that preserves a maximum value of each pooling region and also creates switch variables that record the location of the maximum value in each pooling region. Unpooling uses the switch variables to recreate the unpooled map from a single input (representing the pooled map).

Figure 5D:
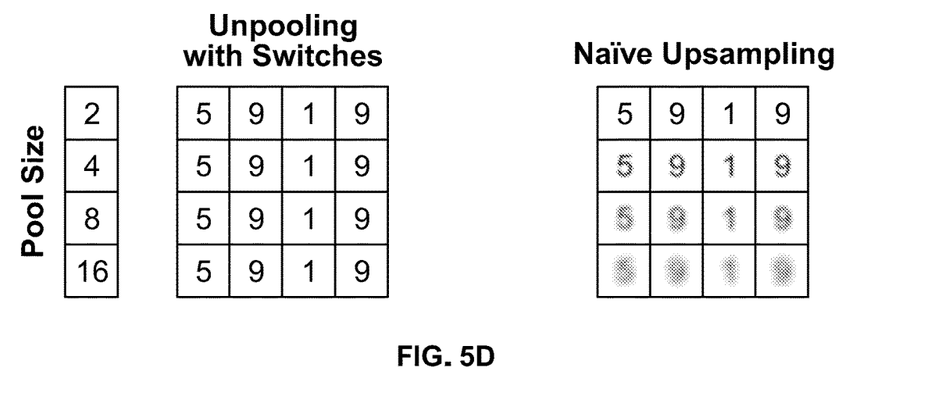
FIG. 5D illustrates results of unpooling compared to results of naïve upsampling.

An example of the difference between simple naïve upsampling using interpolation and unpooling using switches to preserve location coordinates is shown in FIG. 5D. Unpooling and naïve sampling were both performed using pooling sizes/regions of 2, 4, 8, and 16. As can be seen from FIG. 5D, upsampling results in significant loss of information compared to unpooling, particularly for larger pooling sizes. This demonstrates that preservation of the locations of the maximum values in the pooled feature maps using switches is important.

In the example shown in FIG. 5D, results of unpooling and upsampling are shown as applied to feature maps representing an array of digits. It should be understood that similar results would be achieved in applying unpooling and upsampling to features maps representing noisy signals.

Figure 5E:
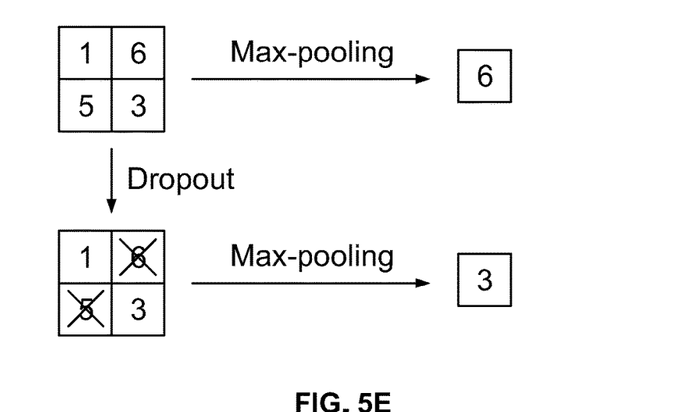
FIG. 5E illustrates an example of dropout used in pooling.

Turning now to a detailed explanation of dropout, FIG. 5E illustrates an example of dropout used in maxpooling. In the example shown in FIG. 5E, the pooling region is a 2×2 array of values. Referring to FIG. 5E, without dropout, maxpooling would always choose the maximum value in the pooling region. In the case shown in FIG. 5E, the value "6" would always be chosen. However, applying dropout, any one or more values in the pooling region may be dropped out. For example, values "5" and "6" may be dropped out. The maximum value of the remaining values in the pooling region is then chosen. In the case shown in FIG. 5E, the value "3" is chosen. Clearly, with dropout it is not necessary that the maximum value be chosen from the pooling region. Adding dropout to maxpooling makes maxpooling a stochastic (random) procedure, as the maximum value is not always chosen for a pooling region.

Figure 6:
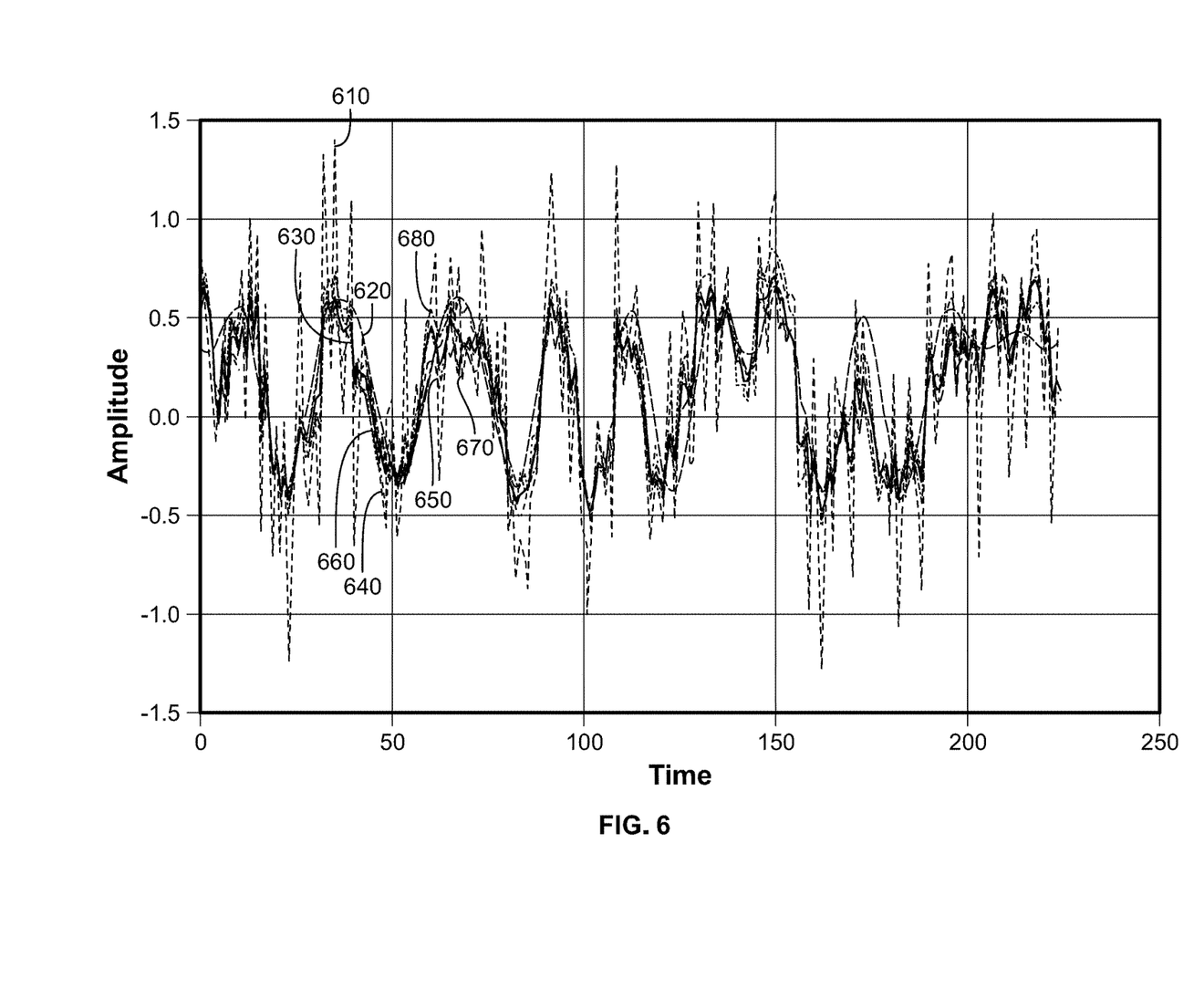
FIG. 6 illustrates example results of signal denoising accomplished using a trained denoising convolutional autoencoder according to illustrative embodiments.

FIG. 6 illustrates example results of signal denoising accomplished using a trained denoising convolutional autoencoder according to illustrative embodiments. To compensate for potential outliers in network performance due to specific, random initializations of filter weights, stratified k-fold cross validation was performed with k=5. The dataset was partitioned into folds of size n samples, with equal numbers of samples in each fold. Using a fixed initialization seed, weights were initialized randomly on five separate filters. Each of these filters was then trained to convergence against a fold.

FIG. 6 shows the individual performance of each randomly weighted filter and the ensemble performance of the randomly weighted filters over time. Referring to FIG. 6, the dashed line 610 represents the contaminated noisy input, line 620 represents the uncontaminated signal, and line 630 represents the ensemble reconstruction of the uncontaminated signal. The remaining lines 640, 650, 660, 670, and 680 represent individual estimates of the uncontaminated signal produced using stochastic (random) initiations of filter weights. As can be seen from FIG. 6, both the ensemble reconstruction 630 and the individual estimates 640-680, 650, 670, 680 closely match the original uncontaminated signal 620. It should be appreciated that the prediction of a denoised signal may be produced using an individual model including a set of weighted filters or an ensemble set of different models using different weighted filters, without the loss of generality.

Figure 7:
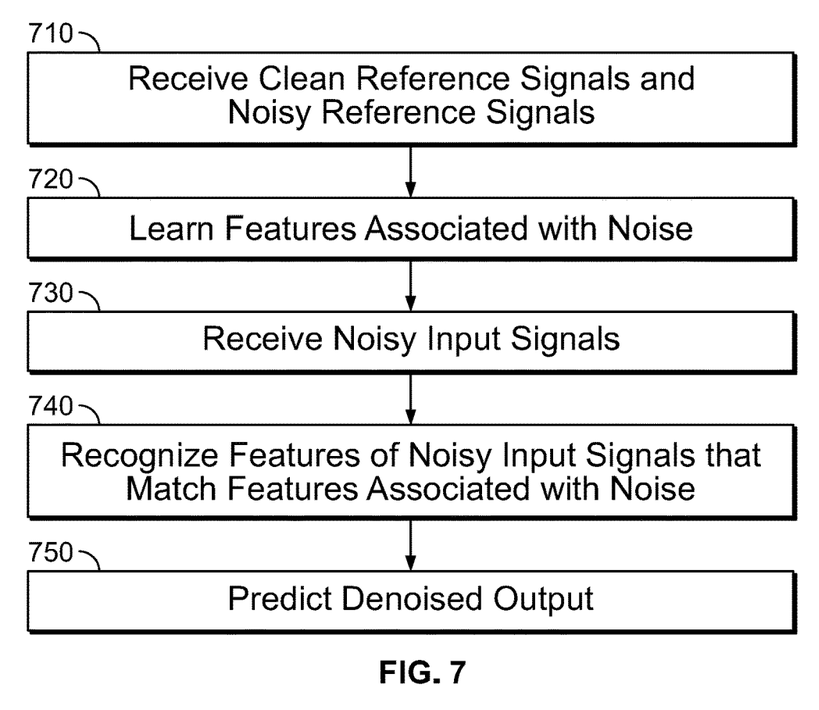
FIG. 7 is a flow chart showing steps in a process for performing denoising according to illustrative embodiments.

FIG. 7 is a flow chart showing steps in a process for denoising input signals according to illustrative embodiments. It should be appreciated that the steps and order of steps described and illustrated are provided as examples. Fewer, additional, or alternative steps may also be involved in the process for denoising an input signal, and/or some steps may occur in a different order.

Referring to FIG. 7, the process 700 begins at step 710 at which a series of random reference signals is received, along with the reference signals mixed with unknown noise in a transmission environment. These reference sample signals may include I/Q modulated signals 110A, and the noise may be produced by the noise source 120A. These input signals are converted into vector form. At step 720, features associated with the noise mixed with the reference signals are learned by the convolutional autoencoder 200. This step includes unsupervised training by the convolutional autoencoder 200 to adjust the weights of the filters of the convolutional autoencoder 200 as described above with reference to FIGS. 1 and 3.

Once trained, at step 730, the convolutional autoencoder 200 receives input signals, e.g., signals 1106, transmitted in a transmission environment 120B having the same noise as the noise that the reference signals were subjected to. At step 740, the convolutional autoencoder 200 recognizes features of the noisy input signals that at least partially match at least some of the features of the noise that was applied to the reference signals. At step 750, the convolutional encoder 200 predicts a denoised output as described above with reference to FIGS. 2 and 3.

It should be appreciated that the process shown in FIG. 7 is adapted to a particular transmission environment. As the transmission environment changes such that the reference signals change, the process may need to be restarted, using reference signals from the changed transmission environment. The changes to the transmission environment may be discovered by probing the environment on a regular basis or at random times for reference signals.

Although the process illustrated in FIG. 7 is directed to denoising radio frequency signals, it should be appreciated that such a process could be used to analyze other types of signals having rapidly varying time series, such as vibrational data, data from gyroscopic or inertial navigation systems, data from computer systems, data from energy grids, etc.

It should further be appreciated that the unsupervised training step 720 described above, which could be based on measured or synthetic reference signals, could be replaced with other methods of setting the autoencoder weights. This could be important in situations where compartmentalization of information is of great importance. In such situations, the autoencoder weights could be prepared at a high security level based on compartmentalized information. Once trained, the system and methodology descried herein could be deployed in a lower-security area.

Figure 8:
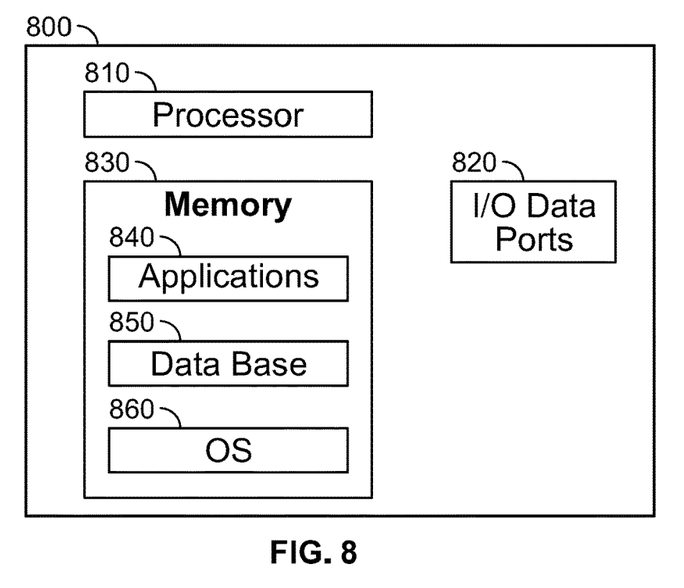
FIG. 8 illustrates an example of a computing device with which a system for performing denoising without a noise model may be implemented according to illustrative embodiments.

FIG. 8 is a block diagram of a computing device with which the denoising system may be implemented, according to illustrative embodiments. Although no connections are shown between the components illustrated in FIG. 8, those skilled in the art will appreciate that the components can interact with each other via any suitable connections to carry out device functions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Referring to FIG. 8, the computing device 800 may be implemented in any suitable computing device, e.g., a consumer laptop. The computing device 800 includes a processor 810 that receives inputs and transmits outputs via I/O Data Ports 820. The I/O Data Ports 820 can be implemented with, e.g., any suitable interface through which data and signals may be received and transmitted wired and/or wirelessly. For example, the inputs may include noisy radio signals, and the outputs may denoised radio signals.

Although not shown, the computing device 800 may also include a physical hard drive. The processor 810 communicates with the memory 830 and the hard drive via, e.g., an address/data bus (not shown). The processor 810 can be any commercially available or custom microprocessor. The memory 830 is representative of the overall hierarchy of memory devices containing the software and data used to implement the functionality of the device 800. The memory 830 can include, but is not limited to the types of memory devices described above. As shown in FIG. 8, the memory 830 may include several categories of software and data used in the device 800, including applications 840, a database 850, an operating system (OS) 860, etc.

The applications 840 can be stored in the memory 830 and/or in a firmware (not shown) as executable instructions, and can be executed by the processor 810. The applications 840 include various programs that implement the various features of the device 800. For example, the applications 840 may include applications to implement the functions of the convolutional autoencoder 200 (including training and post-training denoising), as well as an application to convert input radio samples to a vector for use by the convolutional autoencoder 200.

The database 850 represents the static and dynamic data used by the applications 840, the OS 860, and other software programs that may reside in the memory. The database may 850 may be used to store various data including data needed to execute the applications 840.

While the memory 830 is illustrated as residing proximate the processor 810, it should be understood that at least a portion of the memory 830 can be a remotely accessed storage system, for example, a server on a communication network, a remote hard disk drive, a removable storage medium, combinations thereof, and the like.

It should be understood that FIG. 8 and the description above are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software in addition to, or instead of, computer readable instructions. For example, the denoising system could be implemented in whole or in part on specialized hardware, for example in a field-programmable gate array in order to achieve faster computation times.

According to illustrative embodiments, the SNR of an arbitrary digital modulation may be increased through the use of unsupervised learning, specifically with convolutional autoencoders. The blind denoising technique described herein uses a minimum number of parameters, such as weights and sparsity targets, that may be adapted as desired by the user to achieve different effects.

In addition to the advantages for denoising, the systems and methods described herein provide further advantages. Because the convolutional autoencoder described herein is tasked with making the best arbitrary reconstruction of a signal, the reconstruction loss provides a performance measure. If this performance measure increases rapidly without a corresponding change in the transmission or receiving system, this indicates that a new phenomenon is present. Additionally, this may indicate that this phenomena was not present at the time of training and thus that an anomaly is present. Changes in the reconstruction loss may provide guidance for downstream systems tasked with identifying detrimental signals (e.g., jamming) or environmental aspects that should be learned and compensated for.

In addition, the convolutional encoding layer of the convolutional autoencoder captures useful features that may be used for classification, description, and analogy. Thus, it may be possible to both denoise and encode RF information in a single step. Additionally, the use of the encoded switch information provided by the convolutional autoencoder may provide an avenue for context-sensitive representation. This may provide useful indicators of system posture or potentially message content based on the relative locations of the features in RF transmissions of different types.

The convolutional encoding may also prove useful as a front end to a Long Short Term Memory (LSTM), which may provide another route towards understanding the content or meaning of RF emissions without direct decoding. For example, an unintended, non-traditional modulation emission could be learned and classified using the systems and methods described herein. The presence of that emission relative to other events in the spectrum, learnable with an LSTM network, could allow early-warning systems to be semi-autonomously developed with minimal operator intervention. The use of adversarial networks could be added to the denoising/classification pipeline to improve robustness and generalization ability, especially in the presence of active and known interferers.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method for performing denoising of time-varying input signals, comprising:
   a) learning, by a neural network, features associated with noise added to reference signals;
   b) recognizing, by the neural network, features of noisy time-varying input signals mixed with the noise that at least partially match at least some of the features associated with the noise;
   c) predicting, by the neural network, denoised time-varying output signals that correspond to the time-varying input signals based on the recognized features of the noisy time-varying input signals that at least partially match at least some of the features associated with the noise.

2. The method of claim 1, wherein the reference signals include a series of known random signals received in a transmission environment including the noise, and the time-varying input signals include radio frequency signals received in the transmission environment including the noise.

3. The method of claim 1, wherein the neural network includes at least one layer, and step a) comprises unsupervised training including assigning, by the neural network, weights of filters of the layer of the neural network based on the features associated with the noise added to the reference signals.

4. The method of claim 3, wherein unsupervised training further comprises adjusting the assigned weights of the filters of the layer of the neural network.

5. The method of claim 4, wherein adjusting the assigned weights of the filters includes predicting, by the neural network, denoised output reference signals that correspond to the reference signals without noise, calculating a loss function corresponding to an error between the reference signals and the denoised output reference signals predicted by the neural network and adjusting the weights of the filters such that the loss function is minimized.

6. The method of claim 5, wherein the assigned weights are repeatedly adjusted to minimize the loss function.

7. The method of claim 3, wherein step b) comprises convolving the noisy time-varying input signals using the filters with the assigned weights to produce feature maps representing the recognized features of the noisy time-varying input signals that at least partially match at least some of the features associated with the noise and wherein step c) comprises deconvolving the feature maps using transposed versions of the filters with the assigned weights to predict the denoised time-varying output signals that correspond to the time-varying input signals.

8. The method of claim 7, further comprising pooling the feature maps to produce pooled maps indicating maximum values within pooling regions of the feature maps and switch variables indicating the locations of the maximum values with the pooling regions of the feature maps and unpooling the pooled maps using the switch variables to produce the feature maps.

9. A system for automatically denoising time-varying input signals, comprising:
at least one autoencoder including at least one convolutional layer with filters having assigned weights and at least one deconvolutional layer with transposed versions of the filters having the assigned weights, wherein the autoencoder is configured to:
during a training phase:
learn features associated with noise added to reference signals;
and
during a denoising phase:
recognize features of noisy time-varying input signals mixed with the noise that at least partially match at least some of the features associated with the noise; and
predict denoised time-varying output signals that correspond to the time-varying input signals based on the recognized features of the noisy time-varying input signals that at least partially match at least some of the features associated with the noise.

10. The system of claim 9, wherein the convolutional layer convolves the noisy time-varying input signals using the filters with the assigned weights to produce feature maps representing the recognized features of the noisy time-varying input signals that at least partially match at least some of the features associated with the noise, and the deconvolutional layer deconvolves the feature maps using the transposed versions of the filters with the assigned weights to predict the denoised time-varying output signals that correspond to the time-varying input signals.

11. The system of claim 9, further comprising multiple stacked autoencoders including multiple convolutional layers and multiple deconvolutional layers.

12. The system of claim 9, wherein, during the training phase, the autoencoder learns the features associated with the noise by predicting denoised output reference signals that correspond to the reference signals without noise, calculating a loss function corresponding to an error between the reference signals and the denoised output reference signals predicted by the neural network, and adjusting the assigned weights of the filters such that the loss function is minimized.

13. The system of claim 12, wherein the loss function is a mean squared error function.

14. A device for denoising time-varying input signals, comprising:
a processor; and
a memory having stored thereon instructions which, when executed by the processor, cause the processor to perform steps comprising:
a) performing unsupervised training of a neural network having at least one layer, including assigning weights of filters of the layer of the neural network based on the features associated with the noise added to the reference signals;
b) convolving the noisy time-varying input signals using the filters with the assigned weights to produce feature maps representing recognized features of the noisy time-varying input signals that at least partially match at least some of the features associated with the noise; and
c) deconvolving the feature maps using transposed versions of the filters with the assigned weights to predict denoised time-varying output signals that correspond to the time-varying input signals.

15. The device of claim 14, wherein the reference signals include a series of known random signals received in a transmission environment including the noise, and the time-varying input signals include radio frequency signals received in the transmission environment including the noise.

16. The device of claim 14, wherein unsupervised training further comprises adjusting the assigned weights of the filters of the layer of the neural network.

17. The device of claim 14, wherein adjusting the assigned weights of the filters includes predicting denoised output reference signals that correspond to the reference signals without noise, calculating a loss function corresponding to an error between the reference signals and the predicted denoised output reference signals and adjusting the weights of the filters such that the loss function is minimized.

18. The device of claim 17, wherein the assigned weights of the filters are repeatedly adjusted to minimize the loss function.

19. The device of claim 18, wherein the loss function is a mean squared error function.

20. The device of claim 14, wherein the instructions, when executed by the processor, further cause the processor to perform:
pooling the feature maps to produce pooled maps indicating maximum values within pooling regions of the feature maps switch variables indicating the locations of the maximum values with the pooling regions of the feature maps; and unpooling the pooled maps using the switch variables to produce the feature maps.

\* \* \* \* \*